United States Patent [19]

Chigurupati

[11] Patent Number: 4,735,814
[45] Date of Patent: Apr. 5, 1988

[54] PROCESS FOR MODIFYING BRAN

[75] Inventor: Sambasiva R. Chigurupati, Ralston, Nebr.

[73] Assignee: ConAgra, Inc., Omaha, Nebr.

[21] Appl. No.: 872,205

[22] Filed: Jun. 9, 1986

[51] Int. Cl.$^4$ .................................................. A23L 1/29
[52] U.S. Cl. .................................. 426/294; 426/295; 426/302; 426/622; 426/467; 426/463; 426/804
[58] Field of Search ................ 426/89, 302, 622, 463, 426/467, 93, 804, 96, 294, 295

[56] References Cited

U.S. PATENT DOCUMENTS

| | | | |
|---|---|---|---|
| 1,189,130 | 6/1916 | Kellogg | 426/463 |
| 4,143,163 | 3/1979 | Hutchison et al. | 426/96 |
| 4,565,702 | 1/1980 | Morley et al. | 426/302 |
| 4,568,557 | 2/1986 | Becker et al. | 426/93 |
| 4,619,831 | 10/1986 | Sharma | 426/302 |

Primary Examiner—Raymond N. Jones
Assistant Examiner—Marianne M. Cintins
Attorney, Agent, or Firm—Zarley, McKee, Thomte, Voorhees & Sease

[57] ABSTRACT

A process for modifying bran by coating the bran in a fluidized bed is described wherein the bran is first dried and then ground to a predetermined particle size. The bran is introduced into the coating chamber of a fluidized bed coating process. Cookie four is mixed with distilled water and heated to form a coating mixture and the coating mixture is introduced into the coating chamber so that the ground bran particles will be coated with the coating mixture. As the bran particles are coated, they are dried in the coating chamber of the fluidized bed coating apparatus and are then removed. The resultant product is substantially uniformly coated.

14 Claims, 3 Drawing Sheets

PROCESS FOR MODIFYING BRAN

TECHNICAL FIELD

This invention relates to food products and more particularly to a process for the modification of bran by coating the bran in a fluidized bed process.

BACKGROUND OF THE INVENTION

It is fairly well established that fiber is an important dietary constituent. Fiber is generally defined as a plant material which is resistant to hydrolysis by the enzymes of the mammalian digestive tract. Lack of fiber in the diet (dietary fiber) has been linked to chronic bowel-related diseases such as constipation, diverticulitis, and cancer of the large bowel. Other chronic diet-related disorders associated with the lack of dietary fiber include obesity, cardiovascular disease, and diabetes.

Interest in fiber among consumers and scientists is evidenced by its increasing application to a number of food products, including cereals, breads, crackers, rolls, muffins, and biscuits. Fiber is typically added to foods in the form of wheat bran although a wide variety of other sources are available.

One disadvantage associated with dietary fiber is its gritty mouthfeel. Scientists also believe that dietary fiber has an adverse effect on mineral absorption in the body. According to J. L. Kelsay, et al in the article entitled "Effect of Fiber From Fruits and Vegetables on Metabolic Responses of Human Subjects", Am. J. Clin. Nutr. 31: 1149 (1978), a "number of reports indicates that mineral absorption is decreased by fiber."

An attempt has been previously made to coat bran particles to reduce the gritty mouthfeel. In U.S. Pat. No. 4,500,558, bran material is subjected to a high temperature shear extrusion process. Although the bran is coated to some degree by the process in U.S. Pat. No. 4,500,558, it is believed that substantially uniform coating of the bran is not achieved.

It is therefore a principal object of this invention to provide an improved method for modifying bran or other sources of dietary fiber.

A further object of the invention is to provide a process for modifying bran which results in the bran being coated with a coating comprised of wheat flour such as cookie flour or the like.

Yet another object of the invention is to provide a process for modifying bran so that the bran, when added to foods, will not absorb minerals in the body as readily as uncoated bran.

Yet another object of the invention is to provide a process for modifying bran which results in a bran having an improved mouthfeel.

Still another object of the invention is to provide a process for modifying bran which is economical.

BRIEF DESCRIPTION OF THE DRAWINGS

FIG. 1 is a SEM of the control bran (300×).
FIG. 2 is a SEM of the control bran (1500×).
FIG. 3 is a SEM of the control bran (6000×).
FIG. 4 is a SEM of the coated bran (300×).
FIG. 5 is a SEM of the coated bran (1500×).
FIG. 6 is a SEM of the coated bran (6000×).

SUMMARY OF THE INVENTION

The invention relates to a process for modifying bran by coating the bran in a fluidized bed. The bran is first dried and then ground to a predetermined particle size. The bran is introduced into the coating chamber of a fluidized bed coating process. Cookie flour is mixed with distilled water and heated to form a coating mixture and the coating mixture is introduced into the coating chamber so that the ground bran particles will be coated with the coating mixture. As the bran particles are coated, they are dried in the coating chamber of the fluidized bed coating apparatus and are then removed. The resultant procuct is substantially uniformly coated. The coating on the bran also reduces the bran from absorbing minerals in the body.

DESCRIPTION OF THE PREFERRED PROCESS

Wheat bran from Durum wheat was dried in a microwave/conventional dryer combination to a 5 to 10 percent moisture content. The dried material was then ground in a hammermill followed by a pinmill to achieve finely ground bran. Approximately 1000 grams of the finely ground bran was loaded into the coating chamber of a fluidized bed apparatus. In this specific instance, a fluidized bed coating process developed by the Coating Place, Inc. of Verona, Wis. was used in this work. The process employed by Coating Place, Inc. is commonly known as the Wurster Process and is described in U.S. Pat. Nos. 3,207,824; 3,241,520; 3,253,944; 3,196,827; and 3,089,824. Other types of fluidized bed processes are described in U.S. Pat. Nos. 3,117,027; 3,698,133; and 3,911,183. In the coating chamber, the particles of bran were suspended on an airstream designed to induce a smooth cyclic flow of the particles passed the spray nozzle which atomizes the coating. Approximately 100 grams of cookie flour was mixed with 900 grams of hot distilled water to form a coating mixture. The coating mixture was then sprayed into the coating chamber through the spray nozzle which coats the suspended particles in the coating chamber. The coated particles are lifted on the airstream which dries the particles as it lifts them away from the spray nozzle. At the top of the coating chamber, the particles settle out of the airstream and begin another cycle past the nozzle. This cycle continues until the desired film thickness has been applied. In this particular instance, the bran particles were left in the coating chamber for approximately 45 minutes.

Figure 1:
FIGS. 1–6 are scanning electronmicrographs (SEM).
Figure 2:
Figure 3:
Figure 4:
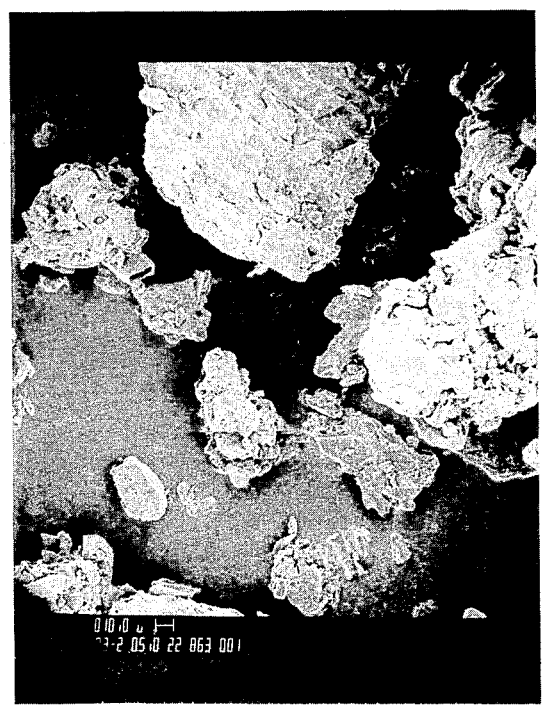
Figure 5:
Figure 6:

FIG. 4 is a SEM (300×) of the coated bran particles. FIG. 5 is a further magnification (1500×) of a portion of FIG. 4 while FIG. 6 is a further magnification (6000×) of a portion of FIG. 5. It can be seen vividly in FIG. 6 that the bran particles appear to be substantially uniformly coated with the coating material so that there are not sharp corners present in the material. FIGS. 1–3 are SEMs of a control bran which was subjected to the same process as that just described except that the bran particles were not coated with a mixture of water and cookie flour. It can be seen vividly in FIGS. 1–3 that the control bran has many sharp corners.

Table A is an analysis of the control bran and the coated bran which compares the moisture, crude protein, crude fat, ash, crude fiber, ADF fiber and NFE of the two products. Table B compares the dry ash mineral content of the coated bran and control bran reported in parts per million. Tables A and B illustrate the fact that the coating of the bran does not substantially alter the gross chemical composition of the bran. Tables C, D and E illustrate the desorbed calcium, iron and zinc concentrations of the two products. Tables C, D and E illustrate the almost identical desorption properties of the control and coated bran with reference to calcium, iron and zinc. Tables F and G list the calcium adsorption, nonbuffered and buffered, of the control bran and coated bran. Tables H and I list the iron adsorption, nonbuffered and buffered, of the coated bran and control bran. Tables J and K list the zinc adsorption, nonbuffered and buffered, of the control bran and coated bran.

TABLE A
Analysis of Control Bran and Coated Bran

|  | Control Bran | Coated Bran |
|---|---|---|
| Moisture | 6.75 | 4.90 |
| Crude Protein | 16.01 | 15.94 |
| Crude Fat | 3.20 | 3.70 |
| Ash | 4.68 | 4.61 |
| Crude Fiber | 10.62 | 10.14 |
| ADF Fiber | 13.27 | 12.68 |
| NFE | 58.74 | 60.71 |

TABLE B
Dry Ashed Mineral Content of Bran Reported as Parts Per Million

|  | Calcium | Iron | Zinc |
|---|---|---|---|
| Coated Bran | 648 | 229 | 80 |
| Control Bran | 695 | 208 | 83 |

TABLE C
Desorbed Calcium Concentrations Reported as mg Ca/g of Bran

|  | Ca (in buffer) | pH |
|---|---|---|
| Coated Bran | 0.28 | 5.56 |
| Control Bran | 0.26 | 5.67 |

TABLE D
Desorbed Iron Concentrations Reported as mg Fe/g of Bran

|  | Fe (in buffer) | pH |
|---|---|---|
| Coated Bran | .008 | 5.56 |
| Control Bran | .007 | 5.67 |

TABLE E
Desorbed Zinc Concentrations Reported as mg Zn/g of Bran

|  | Zn (in buffer) | pH |
|---|---|---|
| Coated Bran | .021 | 2.99 |
| Control Bran | .022 | 3.05 |

TABLE F
Calcium Adsorption - Non Buffered Reported as mg Ca/g Bran [pH in brackets]

|  | Rep. 1 | Rep. 2 | Rep. 3 | Avg. |
|---|---|---|---|---|
| Coated Bran | 2.75 [5.78] | 5.84 [5.73] | 4.17 [5.34] | 4.25 |
| Control Bran | 9.15 [5.77] | 7.34 [5.72] | 4.50 [5.03] | 6.99 |

TABLE G
Calcium Adsorption - Buffered Reported as mg Ca/g Bran [ph in brackets]

|  | Rep. 1 | Rep. 2 | Rep. 3 | Avg. |
|---|---|---|---|---|
| Coated Bran | 4.00 [6.36] | 5.35 [4.79] | 6.42 [4.38] | 5.26 |
| Control Bran | 8.74 [6.03] | 7.59 [4.81] | 7.07 [4.27] | 7.80 |

TABLE H
Iron Adsorption - Non Buffered Reported as mg Fe/g Bran [ph in brackets]

|  | Rep. 1 | Rep. 2 | Rep. 3 | Avg.* |
|---|---|---|---|---|
| Coated Bran | 31.92 [2.13] | 51.05 [2.14] | 37.49 [2.22] | 34.70 |
| Control Bran | 38.57 [2.11] | 40.98 [2.16] | 26.79 [2.21] | 39.78 |

TABLE I
Iron Adsorption - Buffered Reported as mg Fe/g Bran [pH in brackets]

|  | Rep. 1 | Rep. 2 | Rep. 2 | Avg.* |
|---|---|---|---|---|
| Coated Bran | 13.03 [2.17] | 34.34 [2.31] | 21.64 [2.18] | 17.33 |
| Control Bran | 11.81 [2.16] | 21.61 [2.30] | 20.24 [2.16] | 20.92 |

TABLE J
Zinc Adsorption - Non Buffered Reported as mg Zh/g Bran [pH in brackets]

|  | Rep. 1 | Rep. 2 | Rep. 3 | Avg.* |
|---|---|---|---|---|
| Coated Bran | 56.60 [5.64] | 4.99 [5.66] | 11.64 [5.48] | 8.31 |
| Control Bran | 32.58 [5.64] | 16.99 [5.65] | 19.40 [5.41] | 18.20 |

TABLE K
Zinc Adsorption - Buffered Reported as mg Zn/g Bran [pH in brackets]

|  | Rep. 1 | Rep. 2 | Rep. 3 | Avg.* |
|---|---|---|---|---|
| Coated Bran | 49.96 [3.99] | 28.08 [4.00] | 20.00 [4.25] | 24.04 |
| Control Bran | 36.47 [3.96] | 35.69 [3.90] | 18.49 [4.14] | 36.08 |

*Average of two closest values.

As stated hereinabove, the binding of calcium, iron and zinc by wheat bran and the consequence bioavailability of the ions during digestability is a great concern of nutritionists. In this case, two samples of wheat bran were used. One sample was the coated bran and the other sample was a control bran. In the test, the calcium and zinc solutions were 0.06M while the iron solution was 0.04M.

To determine the absorption of minerals by the wheat bran, 100 milliliters of calcium, zinc or iron solution was added to each bran sample (2 grams bran for calcium and 1 gram bran for zinc and iron). The mixture was agitated for three hours at 37° C. on a slowly rotating shaker that kept all parts of the container in contact with the solution. An aliquot from each mixture was decanted to a tube and centrifuged for 20 minutes at 2700 rpm in a IEC Model HN-SII centrifuge with a No. 215 head. The original solution concentration and the centrifuge supernatant concentrations for each ion were determined on a Spectrospan III Argon Plasma Spectometer. A fully calibrated pH determination was made on the centrifuged supernatant.

The original mineral content of the bran was determined by dry ashing according to AACC procedure 08-03 (rapid two hour) and using the Spectrospan III. A buffer was tested to help minimize variability between bran treatments. For calcium and zinc, it was 0.05M sodium acetate at pH 6.0; same buffer for iron but at pH 2.3. Triplicate was run with double the amount of bran (4 grams for calcium and 2 grams for zinc and iron). Desorption was determined by running the samples through the complete four-step procedure above but using acetate buffer in place of the ion solutions. The preceding tables confirm that the coated bran tends to beads lesser amounts of critical mineral components. This fact has potential nutritional advantages.

Other tests were also conducted on the modified bran to determine the baking quality of the bran in cookies. Cookies were prepared according to the AACC Method 10-50D: baking quality of cookie flour (AACC, 1983). Cookie samples utilizing the control bran and the coated bran were utilized as well as a reference sample. The reference sample was made with 100% cookie flour (11.3% moisture, 0.56% ash, 8.61% crude protein, 1.40% crude fat, 0.40% crude fiber, and 77.7% carbohydrate). The modified or coated bran flour and the control bran were utilized in a 50% replacement of the cookie flour.

Since it was known that the modified bran flours would require increased water amounts in order to make cookie dough, a mixograph was used to determine the amount of water necessary in order to make a comparable cookie dough with respect to the reference. This was done by slowly adding water to the cookie dough until a similar mixogram was obtained compared to the reference.

The cookies were evaluated by spread factor (width/thickness ratio), surface score (from the cookie wheel), and color (by HunterLab Tristimulus Colorimeter). Cookie firmness was determined 1 and 11 days after baking by compression in an Instron Universal Testing Machine using a 1 cm/min crosshead speed and 20 cm/min chart speed. Firmness was measured as the peak height (kg) of the curve.

Tables L, M, N and O reproduced hereinbelow list the results of the test performed on the reference, control bran cookie and the coated bran cookie. Tables L, M, N and O illustrate the relative improvements in the baking quality of the coated bran versus the control bran, in that the properties of cookies made with coated bran approximate more closely to that of reference flour.

TABLE L

Water Absorption Levels of Cookie Dough

| Sample | amount of water added (from mixographs) | % Increase from Reference |
|---|---|---|
| Reference (cookie flour) | 3.5 ml | — |
| A0 (control bran) | 10.0 ml | 186% |
| A3 (coated bran) | 8.0 ml | 129% |

TABLE M

Average Spread Factors (Width/Thickness Ratios) and Surface Scores (from Cookie Wheel).

| Sample | Spread Factor | Surface Score |
|---|---|---|
| Reference (cookie flour) | 10.1 | 7 |
| A0 (Control bran) | 4.9 | 3.5 |
| A3 (Coated bran) | 5.6 | 4.5 |

TABLE N

Color Analysis by HunterLab Tristimulus Colorimeter

| Sample | L[a] | a[b] | b[c] |
|---|---|---|---|
| Reference (cookie flour) | 76.34 | 3.96 | 7.29 |
| A0 (Control bran) | 66.07 | 4.82 | 14.92 |
| A3 (Coated bran) | 65.10 | 5.31 | 14.39 |

[a] Visual lightness on a scale of 0–100; 0-perfect black; 100-perfect white.
[b] On a scale of 0–100; plus is red, zero is gray, and minus is green.
[c] On a scale of 0–100; plus is yellow; zero is gray, and minus is blue.

TABLE O

Cookie Firmness (by Instron Universal Testing Machine)

| Sample | Peak Height (kg) 1 Day[a] | Peak Height (kg) 11 Days[b] |
|---|---|---|
| Reference (cookie flour) | 4.56 | 5.60 |
| A0 (Control bran) | 3.44 | 2.33 |
| A3 (Coated bran) | 4.53 | 8.70 |

[a] Crosshead speed = 1 cm/min; chart speed = 20 cm/min; full scale force = 5 kg.
[b] Crosshead speed = 1 cm/min; chart speed = 20 cm/min; full scale force = 10 kg.

Thus it can be seen that the process of this invention results in a potentially nutritionally and functionally superior dietary fiber product as exemplified by the coated wheat bran. Although the process described above relates to wheat bran, the process could be applied to any source of dietary fiber that is finely ground. Similarly, the coating material is a wheat flour but any edible starchy material could be used in place of wheat flour. However, wheat bran and wheat flour are the preferred ingredients.

I claim:

1. A process for modifying bran, comprising the steps of:
   providing a predetermined quantity of bran,
   drying the bran to a predetermined moisture content,
   grinding the bran to a predetermined particle size,
   introducing the ground bran particles into the coating chamber of a fluidized bed coating apparatus and suspending said particles in said apparatus,
   mixing a predetermined amount of a flour material with a predetermined amount of liquid carrier to form a coating mixture,
   introducing the coating mixture into the coating chamber
   substantially uniformly coating the bran particles with the coating mixture until the desired film thickness has been applied thereto so that sharp corners in the coated particles are substantially eliminated and so that the coating mixture will reduce nutrient adsorption by the bran,
   drying the coated bran particles in the coating chamber,
   and removing the dried coated bran particles from the coating chamber.

2. The process of claim 1 wherein said flour material and liquid carrier are heated before being introduced into said coating chamber.

3. The process of claim 1 wherein said flour material comprises cookie flour.

4. The process of claim 1 wherein said liquid carrier comprises water.

5. The process of claim 4 wherein said water comprises distilled water.

6. The process of claim 1 wherein said bran comprises wheat bran.

7. The process of claim 1 wherein said bran comprises Durum wheat bran.

8. The process of claim 1 wherein said bran is dried to a moisture content of approximately 5 to 10 percent.

9. The process of claim 1 wherein the temperature of said coating chamber is approximately 185° F.

10. The process of claim 9 wherein said liquid carrier comprises water and wherein said water is mixed with said flour material at approximately a 9 to 1 ratio by weight; said coating mixture being introduced into coating chamber at approximately a 1 to 1 ratio, by weight, with respect to said bran particles.

11. A process for modifying dietary fiber, comprising the steps of:

provinging a predetermined quantity of dietary fiber, drying the dietary fiber to a predetermined moisture content, grinding the dietary fiber to a predetermined particle size, introducing the ground dietary fiber particles into the coating chamber of a fluidized bed coating apparatus and suspending said particles in said apparatus, mixing a predetermined amount of a starchy material with a predetermined amount of liquid carrier to form a coating mixture, introducing the coating mixture into the coating chamber, substantially uniformly coating the dietary fiber particles with the coating mixture until the desired film thickness has been applied thereto so that sharp corners in the coated particles are substantially eliminated and so that the coating mixture will reduce nutrient adsorption by the bran, drying the coated particles in the coating chamber, and removing the dried coated particles from the coating chamber.

12. The process of claim 11 wherein said starchy material comprises wheat flour.

13. The process of claim 11 wherein said dietary fiber comprises wheat bran.

14. A process for modifying bran, comprising the steps of:

providing a predetermined quantity of bran, drying the bran to a predetermined moisture content, grinding the bran to a predetermined particle size, introducing the ground bran particles into the coating chamber of a fluidized bed coating apparatus and suspending said particles in said apparatus, mixing a predetermined amount of a flour material with a predetermined amount of liquid carrier to form a coating mixture, introducing the coating mixture into the coating chamber, substantially uniformly coating the bran particles with the coating mixture until the desired film thickness has been applied thereto so that sharp corners in the coated particles are substantially eliminated and so that the coating mixture will reduce nutrient adsorption by the bran, drying the coated bran particles in the coating chamber, and removing the dried coated bran particles from the coating chamber, said bran being dried to a moisture content of approximately five to ten percent, said liquid carrier comprising water, said water being mixed with said flour material at approximately a 9 to 1 ratio, by weight, said coating mixture being introduced into said coating chamber at approximately a 1 to 1 ratio, by weight, with respect to said bran particles, said temperature of said coating chamber being approximately 185° F.

* * * * *